(12) United States Patent
Takahashi et al.

(10) Patent No.: US 11,528,420 B2
(45) Date of Patent: Dec. 13, 2022

(54) INFORMATION PROCESSING APPARATUS AND INFORMATION PROCESSING METHOD

(71) Applicant: Sony Corporation, Tokyo (JP)

(72) Inventors: Risa Takahashi, Tokyo (JP); Takashi Hasegawa, Tokyo (JP); Masahiko Naito, Tokyo (JP); Takayuki Ochi, Tokyo (JP); Ryo Yabe, Tokyo (JP); Mizuho Oda, Tokyo (JP); Kenji Tokutake, Tokyo (JP); Chikako Tateishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/269,533

(22) PCT Filed: Aug. 29, 2018

(86) PCT No.: PCT/JP2018/032029
§ 371 (c)(1),
(2) Date: Feb. 19, 2021

(87) PCT Pub. No.: WO2020/044478
PCT Pub. Date: Mar. 5, 2020

(65) Prior Publication Data
US 2021/0218897 A1      Jul. 15, 2021

(51) Int. Cl.
*H04N 5/232* (2006.01)
*H04N 5/262* (2006.01)

(52) U.S. Cl.
CPC ....... *H04N 5/23293* (2013.01); *H04N 5/2628* (2013.01)

(58) Field of Classification Search
CPC ............ H04N 5/23293; H04N 5/2628; H04M 1/72454; G06F 16/587; H04W 4/029; H04W 4/185; H04W 4/21; H04W 4/021
See application file for complete search history.

(56) References Cited

U.S. PATENT DOCUMENTS 9,728,107 B1 *   8/2017   Begen .............. G07B 17/00508
11,159,922 B2 * 10/2021   Ciechanowski ........ H04W 4/14
(Continued)

FOREIGN PATENT DOCUMENTS

EP          2750054 A1      7/2014
JP       2005-209177 A      8/2005
(Continued)

OTHER PUBLICATIONS

International Search Report and Written Opinion dated Dec. 4, 2018, received for PCT Application PCT/JP2018/032029, Filed on Aug. 29, 2018, 10 pages including English Translation.

*Primary Examiner* — Chiawei Chen
(74) *Attorney, Agent, or Firm* — Xsensus LLP

(57) ABSTRACT

[Problem] To achieve presenting surprising information to the user.
[Solution] Provided is an information processing apparatus including a control unit that controls display of visual information performed by a display unit included in a mobile terminal, in which the control unit controls to display, based on a recognized context, one or more images highly related to the context among images captured by a user in past, onto a part of a display area of the display unit. Further provided is an information processing method including controlling, by a processor, display of visual information performed by a display unit included in a mobile terminal, in which the controlling further includes controlling to display, based on a recognized context, one or more images highly related to the context among images captured by a user in past, onto a part of a display area of the display unit.

16 Claims, 11 Drawing Sheets

(56) References Cited

U.S. PATENT DOCUMENTS

| | | | |
|---|---|---|---|
| 2009/0113346 A1* | 4/2009 | Wickramasuriya | G06F 16/955 715/810 |
| 2010/0037141 A1* | 2/2010 | Carter | G06Q 10/10 715/733 |
| 2010/0312474 A1* | 12/2010 | Balardeta | G01S 19/34 701/469 |
| 2013/0274998 A1* | 10/2013 | Kato | B60K 37/06 701/36 |
| 2014/0181123 A1* | 6/2014 | Tuffet Blaise | G06F 16/48 707/749 |
| 2014/0237015 A1* | 8/2014 | Bruins | H04W 52/0209 709/201 |
| 2014/0342782 A1* | 11/2014 | Karmanenko | G06F 1/1601 455/566 |
| 2015/0148005 A1* | 5/2015 | Chau | G06Q 30/00 455/26.1 |
| 2015/0289093 A1* | 10/2015 | Petty | H04L 51/56 455/457 |
| 2015/0332622 A1* | 11/2015 | Liu | G09G 3/2003 705/14.54 |
| 2015/0382141 A1* | 12/2015 | Salmre | H04W 4/02 455/456.3 |
| 2016/0191637 A1* | 6/2016 | Memon | G08G 1/202 709/204 |
| 2016/0327950 A1* | 11/2016 | Bachrach | G06F 3/00 |
| 2016/0352887 A1* | 12/2016 | Na | H04M 1/72436 |
| 2017/0250942 A1* | 8/2017 | Svendsen | H04L 51/32 |
| 2017/0257575 A1* | 9/2017 | Kim | H04N 5/232939 |
| 2018/0053282 A1* | 2/2018 | Engler | G06T 5/00 |
| 2018/0146104 A1* | 5/2018 | Tyson | G06F 16/58 |
| 2020/0049725 A1* | 2/2020 | Torres | G06F 3/0481 |
| 2020/0322537 A1* | 10/2020 | Takami | H04N 5/265 |

FOREIGN PATENT DOCUMENTS

| | | |
|---|---|---|
| JP | 2006-279764 A | 10/2006 |
| JP | 2009-187233 A | 8/2009 |
| JP | 2012-34107 A | 2/2012 |
| JP | 2012-226646 A | 11/2012 |
| JP | 2013-235560 A | 11/2013 |
| JP | 2016-139242 A | 8/2016 |
| WO | 2017/146162 A1 | 8/2017 |

* cited by examiner

INFORMATION PROCESSING APPARATUS AND INFORMATION PROCESSING METHOD

CROSS-REFERENCE TO RELATED APPLICATION

The present application is based on PCT filing PCT/JP2018/032029, filed Aug. 29, 2018, the entire contents of which are incorporated herein by reference.

FIELD

The present disclosure relates to an information processing apparatus and an information processing method.

BACKGROUND

In recent years, mobile terminals having an imaging function have been widespread. In addition, many functions have been proposed for providing a user with added value by using captured images. For example, Patent Literature 1 discloses a technique of displaying a route of a travel course together with an image captured in a predetermined area including the route.

CITATION LIST

Patent Literature

Patent Literature 1: JP 2012-226646 A

SUMMARY

Technical Problem

The technique disclosed in Patent Literature 1 performs image display as described above based on the travel course selected by the user. Furthermore, the technique disclosed in Patent Literature 1 displays only the images that can be easily recalled from the travel course, and thus, does not provide the user with surprising information.

Therefore, the present disclosure proposes a novel and improved information processing apparatus and information processing method capable of achieving information presentation that is surprising to the user.

Solution to Problem

According to the present disclosure, an information processing apparatus is provided. The information processing apparatus includes a control unit that controls display of visual information performed by a display unit included in a mobile terminal, wherein the control unit controls to display, based on a recognized context, one or more images highly related to the context among images captured by a user in past, onto a part of a display area of the display unit.

Moreover, according to the present disclosure, an information processing method is provided. The information processing method includes controlling, by a processor, display of visual information performed by a display unit included in a mobile terminal, wherein the controlling further includes controlling to display, based on a recognized context, one or more images highly related to the context among images captured by a user in past, onto a part of a display area of the display unit.

Advantageous Effects of Invention

As described above, according to the present disclosure, it is possible to achieve information presentation that is surprising to the user.

Note that the above-described effect is not necessarily limited, and it is also possible to use any one of the effects illustrated in this specification together with the above-described effect or in place of the above-described effect, or other effects that can be assumed from this specification.

DESCRIPTION OF EMBODIMENTS

Figure 1:
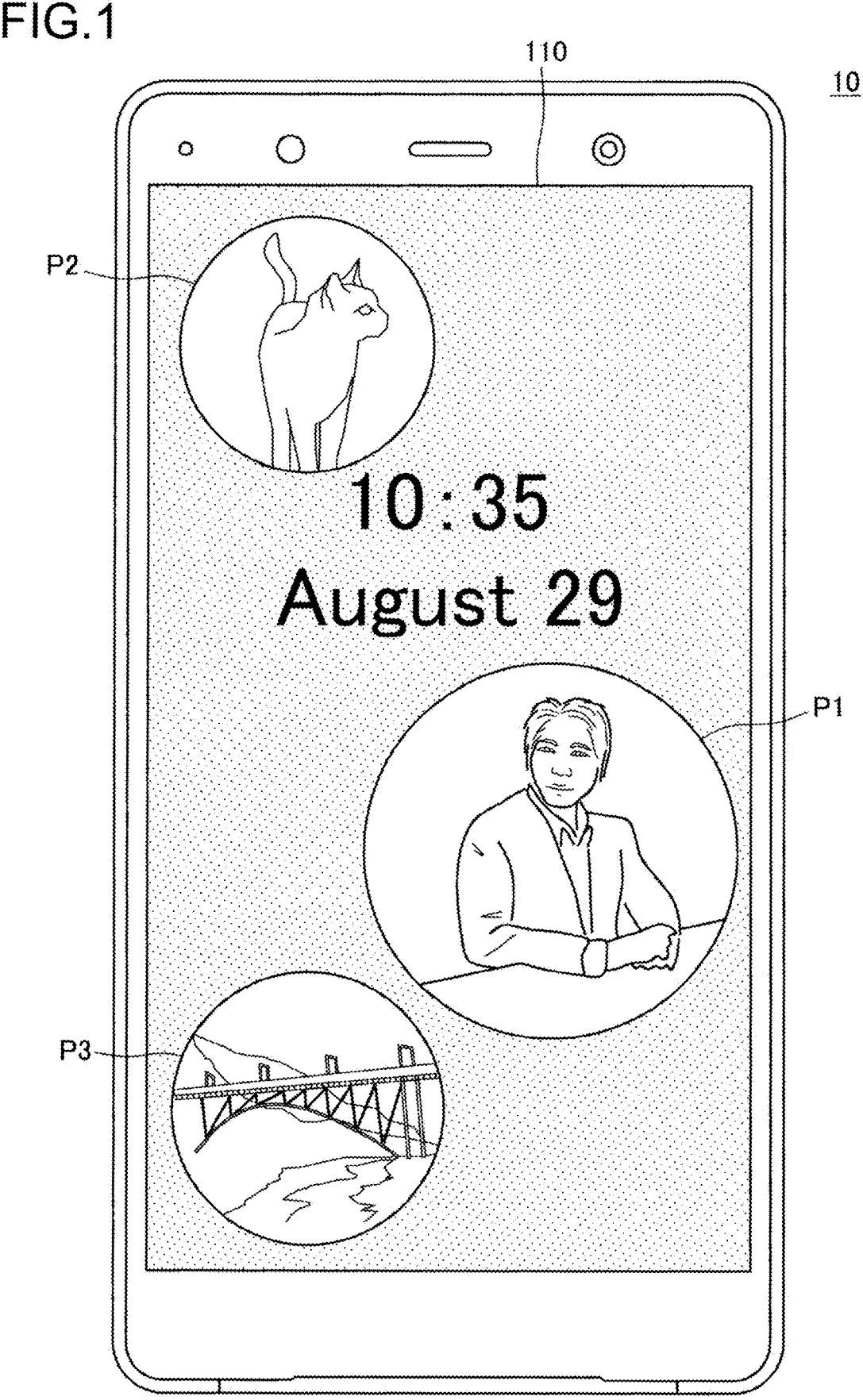
FIG. 1 illustrates an example of an image displayed in a part of a display area of an information processing apparatus according to an embodiment of the present disclosure.

Hereinafter, preferred embodiments of the present disclosure will be described in detail with reference to the accompanying drawings. Note that same reference numerals are assigned to constituent elements having substantially the same functional configuration, and redundant description is omitted in the present specification and the drawings.

The description will be given in the following order.
1. Embodiment
1.1. Overview
1.2. Configuration example
1.3. Display control based on context
1.4. Demo mode and user's permission
1.5. Control flow
2. Hardware configuration example
3. Summary

1. EMBODIMENT

1.1. Overview

First, an overview of an embodiment of the present disclosure will be described. As described above, in recent years, mobile terminals having an imaging function have been widespread. Using the mobile terminal as described above, a user can easily enjoy imaging at home or outside the home.

In addition, the user can view the captured image through an application having an album function, for example. In many cases, the display of the captured image as described above is executed based on user's operation. Therefore, in typical cases, an image captured in the past is not to be displayed unless an operation is performed with an intention of viewing the image. In addition, the case where the user intentionally performs an image display operation is usually a case where the user recalls the stored image to some extent, and thus, the image captured in the past is not likely to be discovered unexpectedly.

The technical concept according to the present disclosure is a concept conceived in consideration of the above points and provided to automatically display a surprising image that recalls past memories to user's mind, for example, and thereby giving the user a surprise, nostalgia, and a sense of happiness.

Therefore, an information processing apparatus 10 according to an embodiment of the present disclosure is characterized by controlling to display, on the basis of a recognized context, one or more images highly related to the context among the images captured by the user in the past, on a part of a display area of a display unit 110.

FIG. 1 is a view illustrating an overview of an embodiment of the present disclosure. FIG. 1 illustrates an example of an image displayed in a part of the display area of the information processing apparatus 10 according to the present embodiment.

In the case of the example illustrated in FIG. 1, the display unit 110 displays three circularly trimmed images P1 to P3 captured in the past using the information processing apparatus 10. Here, the images P1 to P3 may be images selected based on the recognized context.

Specifically, a control unit 140 of the information processing apparatus 10 according to the present embodiment first recognizes the context based on collected sensor information. Next, the control unit 140 selects one or more images highly related to the recognized context that the user has captured in the past, and controls to display the images onto a part of the display area of the display unit 110.

With the above-described function of the control unit 140 according to the present embodiment, a past captured image related to the context, that is, a current situation, can be displayed at an unexpected timing for the user, making it possible to give the user a surprise, nostalgia, and a sense of happiness. A specific example of the context according to the present embodiment will be described below.

Furthermore, the display area according to the present embodiment may include various types of foregrounds and backgrounds, for example. An example of the foreground is a pop-up. Furthermore, examples of the background include wallpaper such as a home screen (desktop), a screen-lock screen, and ambient display. Here, the ambient display according to the present embodiment is a technique of controlling to display a certain type of information (for example, time and various types of notifications) by reducing luminance of the display, prolonging pixel update intervals, or using a part of pixels of the display in a case where the display is asleep. With ambient display, it is possible to effectively reduce the power consumption, compared to the case of maximizing the use of all the functions of the display.

Examples of the ambient display include a technique of continuously displaying some information in pixel units when the display is asleep (in the present disclosure, referred to as Always on Display: AoD) and a technique of displaying some information in pixel units when a user's terminal operation is estimated when the display is asleep (in the present disclosure, referred to as "Smart on Display: SoM").

In the case of SoM, the control unit 140 can control the display unit 110 to perform the ambient display at a timing when the user is estimated to lift the terminal based on acceleration information detected by an acceleration sensor or at a timing when the user is estimated to take out the terminal from a pocket based on the information collected by a proximity sensor, an illuminance sensor, or the like.

Note that, hereinafter, a case where the control unit 140 according to the present embodiment controls the display unit 110 to perform ambient display of an image highly related to the recognized context will be described as a main example.

1.2. Configuration Example

Next, a functional configuration example of the information processing apparatus 10 according to an embodiment of the present disclosure will be described. The information processing apparatus 10 according to the present embodiment may be a mobile terminal having a display. Here, the above-described mobile terminal refers to all small portable computer devices. The information processing apparatus 10 according to the present embodiment may be any of a smartphone, a tablet, various wearable devices, a laptop personal computer (PC), or the like.

Figure 2:
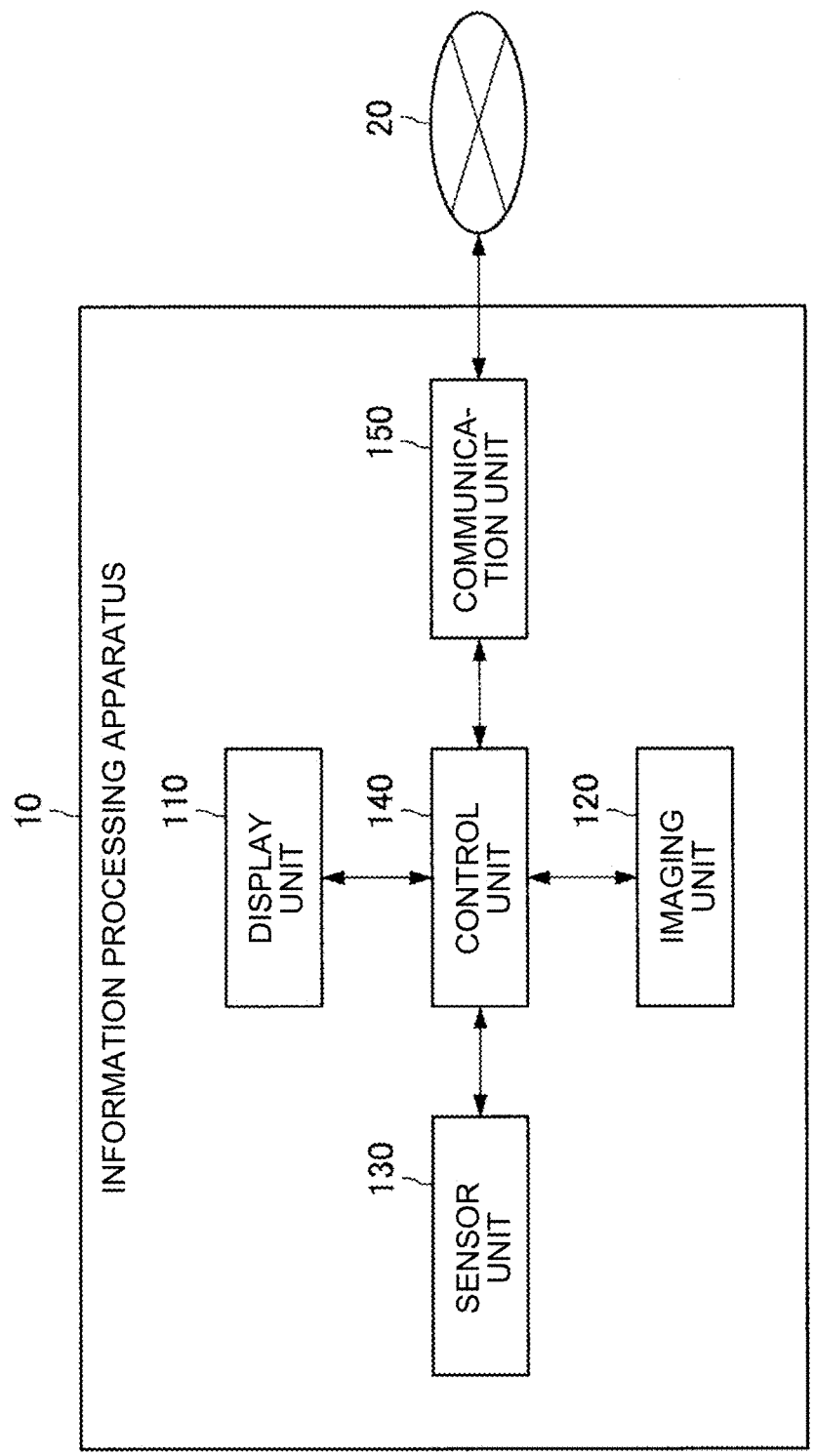
FIG. 2 is a block diagram illustrating a functional configuration example of an information processing apparatus according to the embodiment.

FIG. 2 is a block diagram illustrating a functional configuration example of the information processing apparatus 10 according to the present embodiment. Referring to FIG. 2, the information processing apparatus 10 according to the present embodiment includes a display unit 110, an imaging unit 120, a sensor unit 130, a control unit 140, and a communication unit 150.

(Display Unit 110)

The display unit 110 according to the present embodiment has a function of displaying one or more images highly related to a recognized context onto a part of the display area on the basis of the control of the control unit 140. As described above, the display unit 110 according to the present embodiment may perform ambient display of the above image. For this purpose, the display unit 110 according to the present embodiment may include an Organic Light Emitting Diode (OLED) display or the like capable of emitting light in pixel units. The display unit 110 may implement ambient display by partially suppressing the function of a display such as a liquid crystal display (LCD). The type of display included in the display unit 110 according to the present embodiment can be appropriately selected in accordance with the ambient display method or the like.

(Imaging Unit 120)

The imaging unit 120 according to the present embodiment has a function of capturing a still image or a moving image. Therefore, the imaging unit 120 according to the present embodiment includes various imaging elements.

(Sensor Unit 130)

The sensor unit 130 has a function of collecting various sensor information regarding the surrounding environment and the state of the user. The sensor information collected by the sensor unit 130 can be used for the recognition of the context by the control unit 140. The sensor unit 130 includes, for example, an acceleration sensor, a gyro sensor, a geomagnetic sensor, various optical sensors, a Global Navigation Satellite System (GNSS) signal receiver, and a clock.

(Control Unit 140)

The control unit 140 according to the present embodiment performs overall control of individual components included in the information processing apparatus 10. The control unit 140 according to the present embodiment may control the display of visual information performed by the display unit 110, for example. Here, the control unit 140 according to the present embodiment is characterized in that one or more images highly related to the recognized context are controlled to be displayed on a part of the display area of the display unit 110. As described above, the control unit 140 according to the present embodiment may control the display unit 110 to perform ambient display of an image highly related to the recognized context. Details of the display control function of the control unit 140 according to the present embodiment will be described below.

Furthermore, the control unit 140 according to the present embodiment recognizes the context based on various sensor information collected by the sensor unit 130. The control unit 140 according to the present embodiment can recognize the current position as a part of the context based on the position information acquired by the GNSS signal receiver, for example.

(Communication Unit 150)

The communication unit 150 according to the present embodiment performs information communication with an external device via a network 20. The communication unit 150 according to the present embodiment may acquire user's position information, schedule information, or the like, from an external device, for example. In addition, the communication unit 150 according to the present embodiment may acquire an image stored in an external device.

(Network 20)

The network 20 has a function of connecting the information processing apparatus 10 and various external devices. The network 20 may include a public line network such as the Internet, a telephone network, a satellite communication network, and may include various local area networks (LANs) including the Ethernet (registered trademark), and wide area networks (WANs). Furthermore, the network 20 may include a dedicated line network such as an Internet protocol-virtual private network (IP-VPN). Furthermore, the network 20 may include a wireless communication network such as Wi-Fi (registered trademark) or Bluetooth (registered trademark).

Hereinabove, a functional configuration example of the information processing apparatus 10 according to an embodiment of the present disclosure has been described. Note that the configuration described above with reference to FIG. 2 is merely an example, and the functional configuration of the information processing apparatus 10 according to the present embodiment is not limited to this example. For example, the information processing apparatus 10 according to the present embodiment does not necessarily have to include all of the configurations illustrated in FIG. 2. The information processing apparatus 10 according to the present embodiment can include the control unit 140 and the communication unit 150, for example, and can control a display unit included in another mobile terminal via the network 20. Furthermore, the information processing apparatus 10 according to the present embodiment may further include a configuration such as a storage unit that stores a captured image. The functional configuration of the information processing apparatus 10 according to the present embodiment can be flexibly modified according to specifications and operations.

1.3. Display Control Based on Context

Next, context-based display control according to the present embodiment will be described in detail with a specific example. As described above, the control unit 140 according to the present embodiment is characterized by recognizing a context based on sensor information and controlling to display one or more images highly related to the context on a part of the display area of the display unit 110.

The context according to the present embodiment may include position information, for example. The control unit 140 according to the present embodiment can select an image to be presented in ambient display by the display unit 110 based on the acquired current position.

It is presumable that the user captures various images using the information processing apparatus 10 including images to be desirably hidden from a third party from the viewpoint of privacy and security.

Therefore, the control unit 140 according to the present embodiment may recognize whether the current position is a place of residence such as a home, or outside the home, and may select an image to be presented in ambient display by the display unit 110 based on a result of the recognition.

For example, when the user uses the information processing apparatus 10 in the place of residence, it is presumable that there is a low possibility that a third party exists in the vicinity. Therefore, in a case where it is estimated that the information processing apparatus 10 is located in the residence of the user based on the acquired current position, the control unit 140 may control the display unit 110 to perform ambient display of one or more images randomly selected from a plurality of images captured by the user in the past.

According to the above control performed by the control unit 140 according to the present embodiment, it is possible to present various images to the user without excessive protection in an environment in which the image is unlikely to be viewed by a third party.

Furthermore, when it is estimated that the information processing apparatus 10 is located in the user's residence based on the acquired current position, that is, when the user is estimated to be using the information processing apparatus 10 in the residence, the control unit 140 according to the present embodiment may treat date and time information as a context, and may control the display unit 110 to perform ambient display of the image captured by the user at the date and time related to the current date and time, based on the acquired current date and time.

Figure 3:
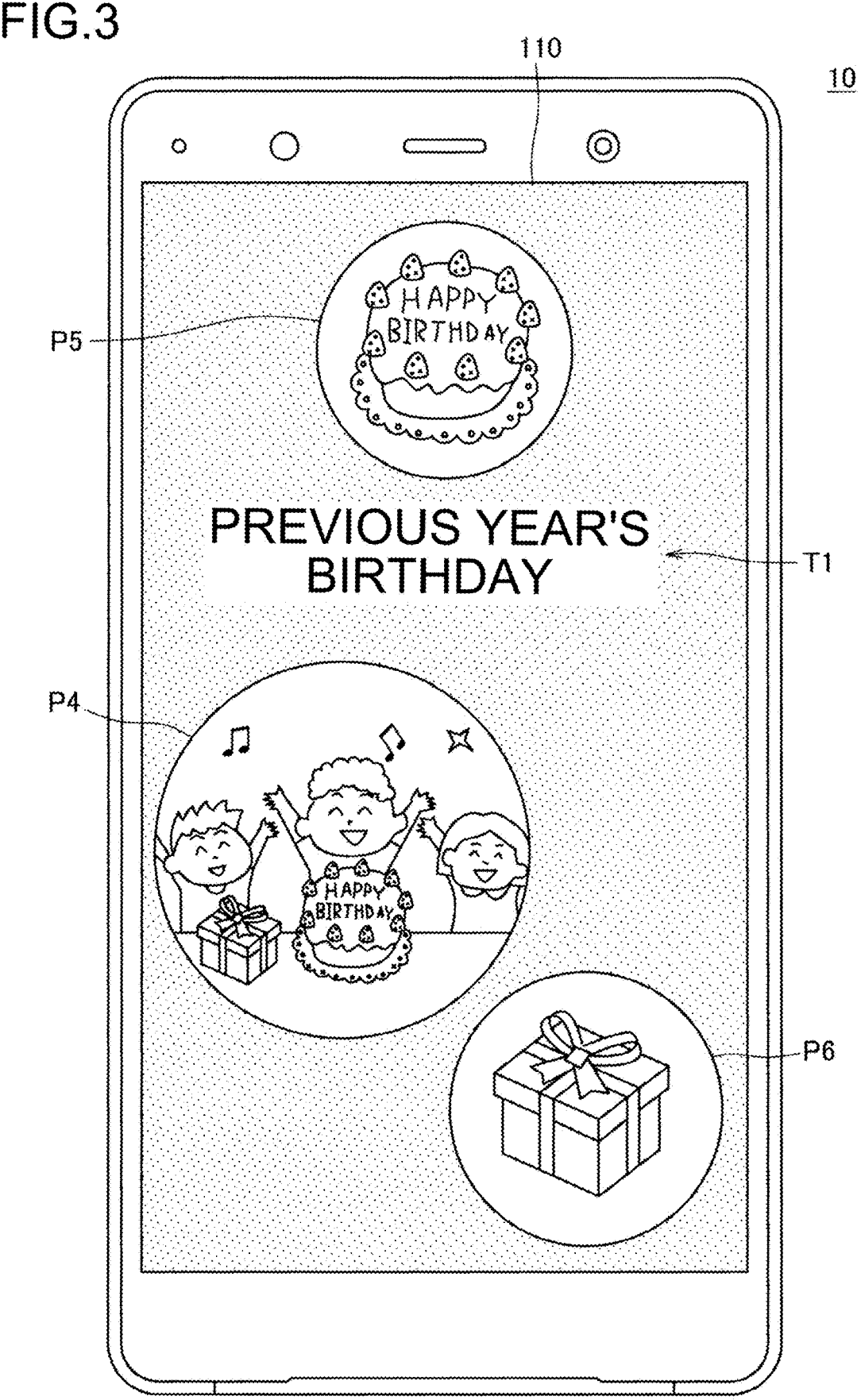
FIG. 3 is a view illustrating an example of ambient display based on date and time information according to the embodiment.

FIG. 3 is a view illustrating an example of ambient display based on date and time information according to the present embodiment. In the example illustrated in FIG. 3, when the current date and time is the birthday of the user or the user's family, the control unit 140 controls the display unit 110 to perform ambient display of images P4 to P6 captured by the user on the previous year's birthday. At this time, the control unit 140 can also control the display unit 110 to perform ambient display of a text T1 such as "last year's birthday" together with the images P4 to P6. The control unit 140, for example, may compare the date of "birthday" stored in the information processing apparatus 10 or an external device with the date and time on which the image is captured so as to determine that the image is an image captured on the "birthday". In addition, the control unit 140 can also make a determination regarding "birthday" based on tag information attached to the image, for example.

With the above control by the control unit 140 according to the present embodiment, it is possible to present the image captured at the past date and time related to the current date and time to the user at an unexpected timing, and possible to recall the past memories to user's mind and give the user a sense of happiness, or the like.

Examples of the date and time related to the current date and time include a date and time such as N months before and N years before. In addition, the control unit 140 can also control the display unit 110 to perform ambient display by mixing images captured at different related dates and times. For example, the control unit 140 may control the display unit 110 to simultaneously perform ambient display of an image captured one year ago and an image captured one month ago.

The display control performed in a case where the user uses the information processing apparatus 10 at the place of residence has been described above. In addition to the place of residence, the display control as described above may be performed at a workplace, or a school, for example. In this case, the user may be given a capability to set whether the above-described random display or display based on the related date and time is to be permitted at a workplace or school. A known technique such as Geofence may be used to determine whether the current position is a place of residence or a workplace.

Next, display control performed in a case where the user is using the information processing apparatus 10 outside the home will be described with a specific example. Since there is a high possibility that an image will be peeped by a third party outside the home, the control unit 140 may restrict the image to be displayed by the display unit 110.

For example, in a case where the information processing apparatus 10 is estimated to be located outside the home based on the acquired current position, that is, the user is estimated to be using the information processing apparatus 10 outside the home, the control unit 140 may restrict the image to be presented in ambient display to an image captured by the user in the vicinity of the current position in the past.

Figure 4:
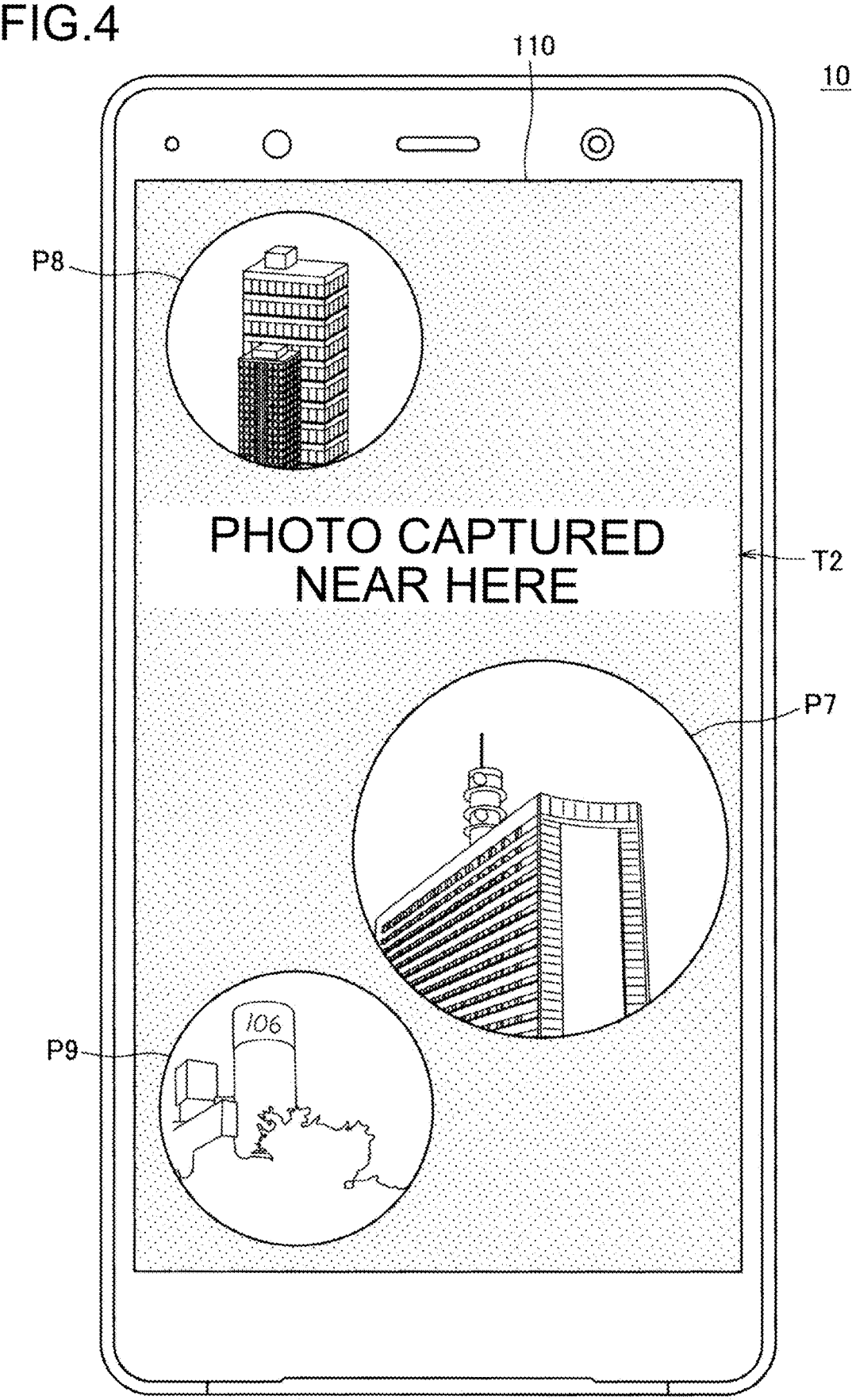
FIG. 4 is a view illustrating an example of ambient display based on a current position according to the embodiment.

FIG. 4 is a view illustrating an example of ambient display based on the current position according to the present embodiment. In the example illustrated in FIG. 4, in a case where the user is using the information processing apparatus 10 outside the home, the control unit 140 controls the display unit 110 to perform ambient display of the images P7 to P9 captured by the user in the past in the vicinity of the current position of the imaging. In addition, the control unit 140 can also control the display unit 110 to perform ambient display of a text T2 such as "photo captured around here" together with the images P7 to P9. Note that the control unit 140 may judge a range within a radius of about 200 meters around the current position as the vicinity of the current position.

With the above-described control performed by the control unit 140 according to the present embodiment, it is possible to present an image captured in the past in the vicinity of the current position to the user at an unexpected timing while protecting privacy and possible to recall the past memories to user's mind and give the user a sense of happiness.

Note that the control unit 140 can specify an image captured in the vicinity of the current position or an image captured at a related date and time by searching metadata such as Exchangeable image file format (Exif).

The display control based on the position information and date and time information according to the present embodiment has been described above. Next, the display control based on a fellow person according to the present embodiment will be described. The control unit 140 according to the present embodiment can also recognize a fellow person associated with the user who uses the information processing apparatus 10 and can control the display unit 110 to perform ambient display of an image including the fellow person as a subject. That is, the context according to the present embodiment may include a fellow person who is acting with the user who uses the information processing apparatus 10.

Figure 5:
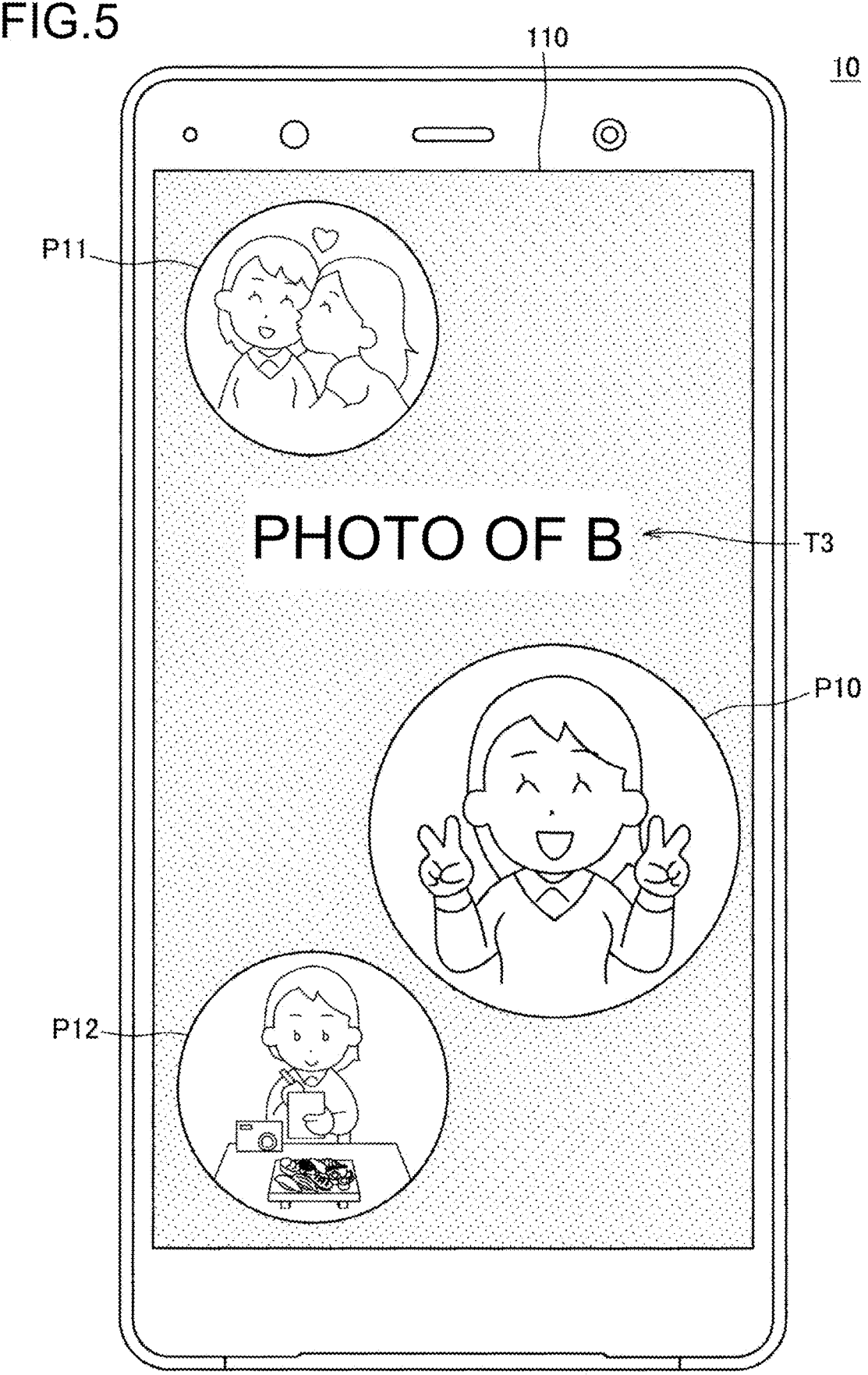
FIG. 5 is a view illustrating an example of ambient display based on a fellow person according to the embodiment.

FIG. 5 is a view illustrating an example of ambient display based on a fellow person according to the present embodiment. In an example illustrated in FIG. 5, in the situation where the user is with a fellow person B, the control unit 140 controls the display unit 110 to perform ambient display of images P10 to P12 in which the fellow person B is a subject, based on the recognized fellow person B. Furthermore, the control unit 140 may control the display unit 110 to perform ambient display of a text T3 such as "photo of person B" together with the images P10 to P12.

According to the above-described control performed by the control unit 140 according to the present embodiment, it is possible to display an image that both the user and the fellow person can enjoy together at an unexpected timing, and it is possible to provide a topic to the user and the fellow person present in conversation.

Note that the control unit 140 may communicate with a mobile terminal used by the fellow person through the network 20 (for example, a wireless communication network such as Bluetooth) and may thereby estimate that the user and the fellow person are both present, for example. In addition, in a case where the user and the fellow person have uploaded the position information to an external device or the like, the control unit 140 can specify the fellow person by receiving a matching result based on the position information from the external device.

In addition, the control unit 140 can specify an image in which the fellow person is a subject on the basis of a recognition result based on the tagging by the user or the image analysis.

Next, the display control based on the elapsed time after imaging according to the present embodiment will be described. The context according to the present embodiment may include the elapsed time after imaging. For example, the control unit 140 according to the present embodiment may control the display unit 110 to perform ambient display of an image for which elapsed time after the imaging is within a predetermined time.

Figure 6:
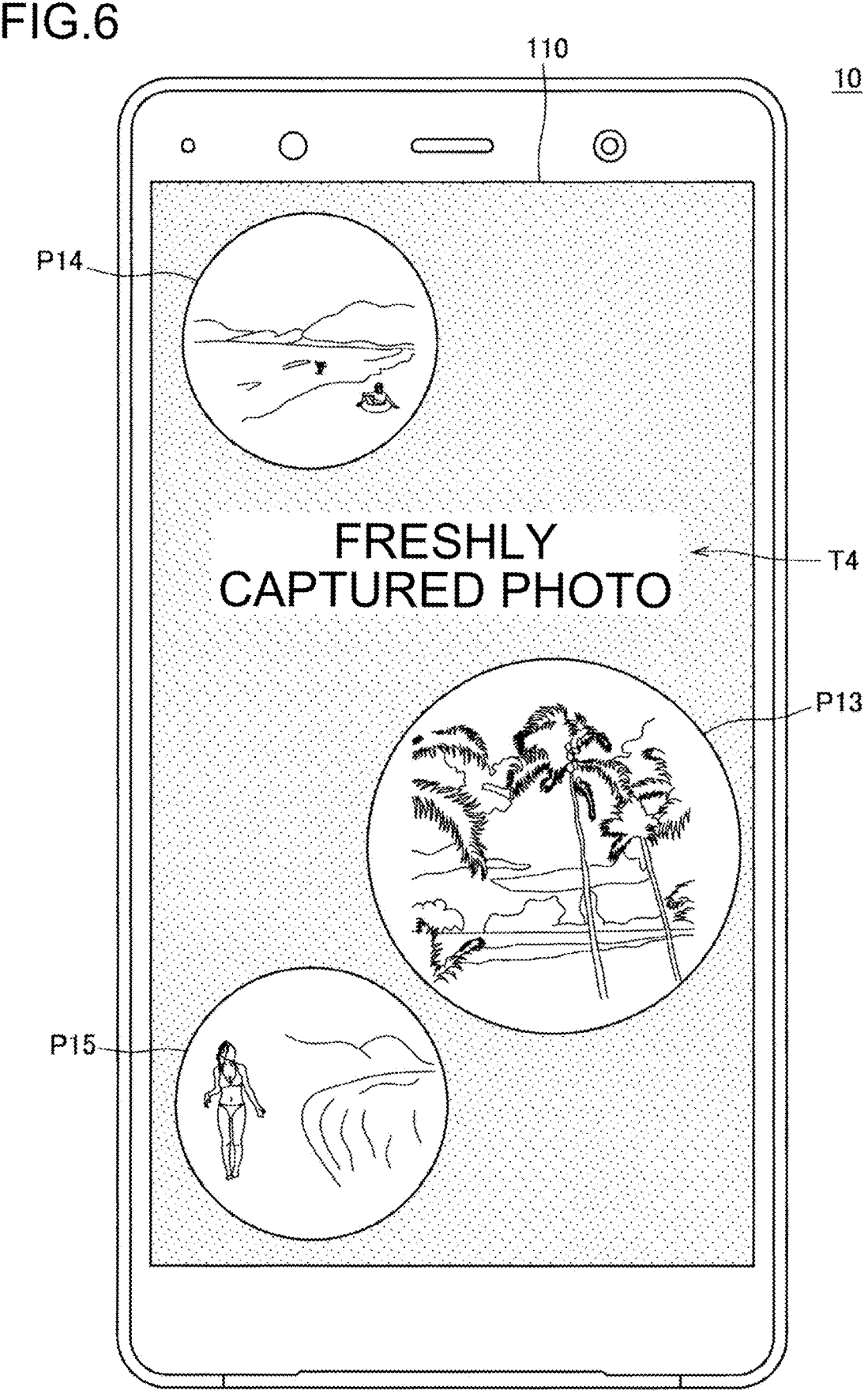
FIG. 6 is a view illustrating an example of ambient display based on elapsed time after a shadow according to the embodiment.

FIG. 6 is a view illustrating an example of ambient display based on the elapsed time after imaging according to the present embodiment. In the example illustrated in FIG. 6, the control unit 140 controls the display unit 110 to perform ambient display of images for which elapsed time after imaging is within 10 minutes, that is, images P13 to P15 that have just been captured. Furthermore, the control unit 140 controls the display unit 110 to perform ambient display of a text T4 such as "a photo just captured" together with the images P13 to P15.

According to the above-described control performed by the control unit 140 according to the present embodiment, the image captured by the user can be controlled to be presented in ambient display for the purpose of preview, leading to satisfaction of the user's desire to immediately confirm the captured image.

Furthermore, in a case where there is a plurality of images for which elapsed time after imaging is within a predetermined time, it is allowable to perform control so as to suppress simultaneous ambient display of a plurality of images having imaging date and time shorter than a predetermined interval. For example, unless performing special control when a user captures a plurality of images in a short time using a continuous imaging function, a plurality of images having similar compositions would be presented in ambient display.

In order to avoid such a situation as described above, the control unit 140 according to the present embodiment may perform control so as to suppress simultaneous display of images for which imaging date and time are within one minute. According to the above control, it is possible to perform ambient display of a plurality of images having different compositions, and possible to further entertain the user. The control unit 140 may determine the similarity of the composition based on the result of the image analysis.

The display control based on the context according to the present embodiment has been described above with reference to specific examples. Note that although FIGS. 3 to 6 illustrate an example in which three circularly trimmed images are presented in ambient display, the display format of the images according to the present embodiment is not limited to such an example. For example, the control unit 140 may perform ambient display of four or more images, or may use ambient display to present an image obtained by simply reducing the original image.

Furthermore, the control unit 140 may perform control so that the display format is random, or may select the display format from a plurality of patterns based on the number of images to be displayed, for example.

The control unit 140 can also control the display unit 110 to perform ambient display of thumbnail images representing captured moving images.

Furthermore, the above includes description of selection of an image highly related to the context recognized by the control unit 140. At this time, the control unit 140 may restrict the image search range to a standard folder to store images captured by the imaging unit 120, for example. According to such control, it is possible to prevent execution of ambient display of downloaded images, screenshot images, or the like, making it possible to achieve protection of privacy and security.

Furthermore, from the viewpoint of ensuring security, the control unit 140 may perform control so as to suppress ambient display of a photo in which a character string is the main subject. According to this control, for example, it is possible to prevent execution of ambient display of information of a document or whiteboard captured by the user as a memo.

Furthermore, the image to be presented in ambient display may be selected by the user. For example, a user may be allowed to set such that an image is not to be presented in ambient display by designating an attribute such as "Hide" in an application having an album function (hereinafter, may be simply referred to as an album function). Furthermore, the user may be allowed to arbitrarily set an image folder that is an object of ambient display.

Next, timing control of ambient display according to the present embodiment will be described. As described above, the control unit 140 according to the present embodiment can control the display unit 110 to perform ambient display of an image selected based on various contexts. On the other hand, continuing the ambient display for a long time or repeating the ambient display many times in a short time might impair surprising quality or cause the user to feel annoyed.

Therefore, the control unit 140 according to the present embodiment may appropriately control a start timing and an end timing of the ambient display. For example, the control unit 140 according to the present embodiment may perform control such that the ambient display ends after a lapse of a predetermined time (for example, 10 minutes) from the time at which the display unit 110 is controlled to start the ambient display. According to such control, it is possible to prevent the user from getting bored due to the display of the same image for a long time. In the case of SoD, even after all ambient display is completed based on the SoD time setting, the same image may be repeatedly presented as ambient display until the time used for the ambient display of the image reaches the predetermined time.

Furthermore, the control unit 140 according to the present embodiment may perform control so as to suppress the ambient display of an image until a predetermined time has elapsed from the time at which the display unit 110 is controlled to finish the ambient display. That is, the control unit 140 according to the present embodiment may control the interval at which the ambient display is executed. The interval may be 30 minutes, for example. The control unit 140 according to the present embodiment may perform control such that the ambient display is not performed again until 20 minutes have elapsed after execution of the ambient display for 10 minutes by the display unit 110. According to the above-described control by the control unit 140 according to the present embodiment, it is possible to reduce the possibility to impair the surprising quality caused by repeated execution of ambient display in a short period of time and the possibility to cause the user to feel annoyed.

Note that the similar intervals as above may be applied to the acquisition timing of position information. The control unit 140 may control to acquire position information at the start of execution of the ambient display and may control to suppress unnecessary activation of a position information acquisition function during continuation of the ambient display and the waiting period after the end of the display. According to such control, power consumption can be effectively reduced.

On the other hand, when the current position changes significantly during the above interval (for example, when the user goes out of the house), the control unit 140 may use the change at the current position as a trigger to perform control such as resetting the condition related to the interval of ambient display.

Next, ambient display provided in cooperation with the album function according to the present embodiment will be described. For example, in a case where a trimmed image, a reduced image, or the like is displayed as ambient display as illustrated in FIGS. 3 to 6, there is a possibility that a user who has visually recognized the image might request the display of an original image. Therefore, the control unit 140 according to the present embodiment may enlarge and display an entire image in cooperation with the album function in a case where the user has selected an image presented by the display unit 110 as ambient display.

Figure 7:
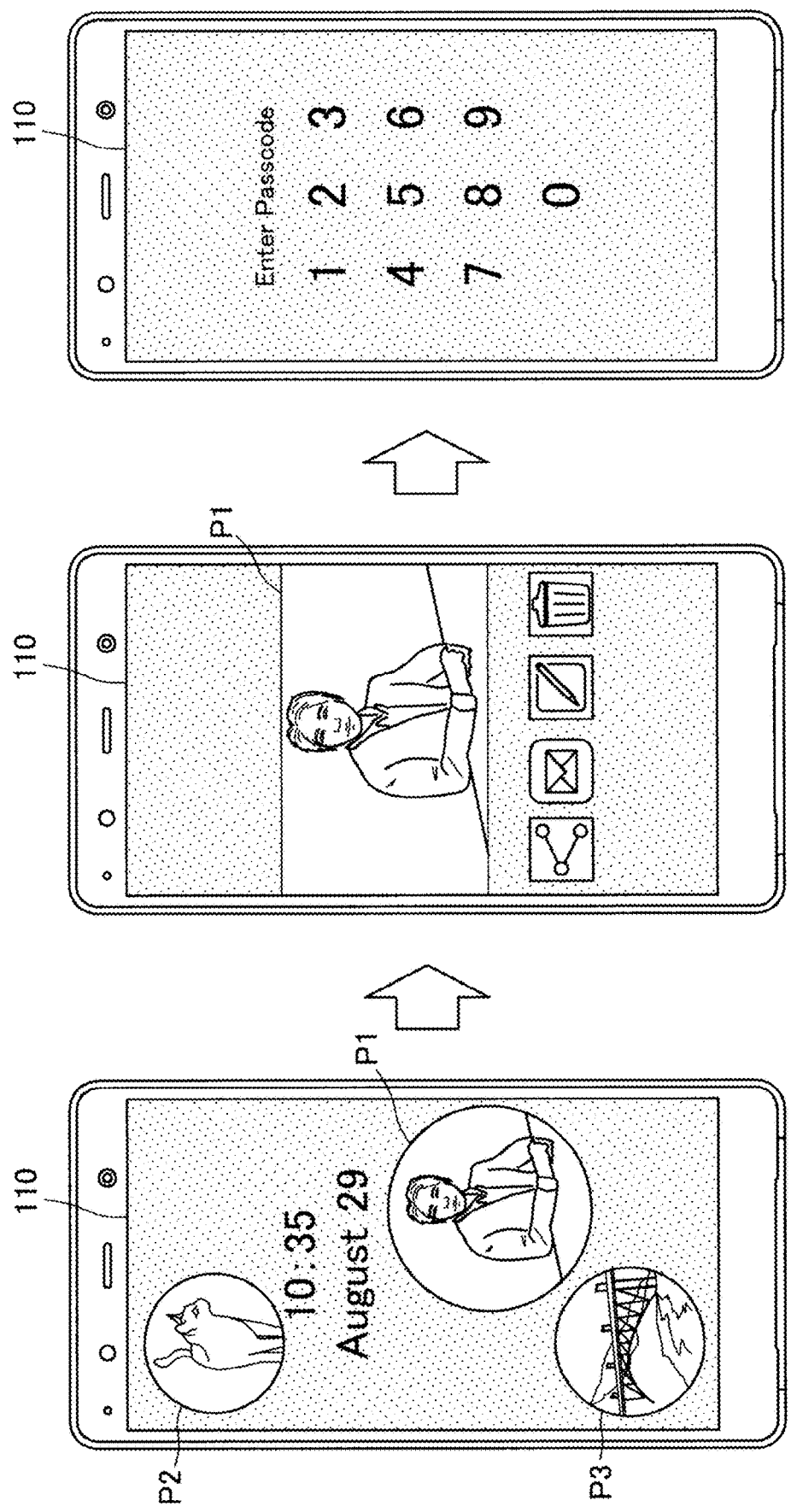
FIG. 7 is a view illustrating an example of ambient display provided in cooperation with an album function according to the embodiment.

FIG. 7 is a view illustrating an example of ambient display provided in cooperation with the album function according to the present embodiment. The left-side figure of FIG. 7 illustrates a state where the display unit 110 is performing ambient display of the images P1 to P3 under the control of the control unit 140.

Here, in a case where the user taps to select the image P1, for example, the control unit 140 according to the present embodiment controls to display an enlarged entire image P1 as illustrated in the center of the figure, in cooperation with the album function. Under the above control by the control unit 140 according to the present embodiment, the user can easily confirm the original image without unlocking the information processing apparatus 10.

In a case where the user subsequently attempts to execute various processes on the original image, the control unit 140 may control the display unit 110 to display a lock screen and ask the user to input a password.

The display control based on the context according to the present embodiment has been described above with reference to specific examples. The control unit 140 according to the present embodiment can also perform display control based on two or more contexts.

For example, in a case where the user is using the information processing apparatus 10 outside the home, the control unit 140 may first preferentially treat the context related to the elapsed time after imaging, and may control the display unit 110 to display an image for which an elapsed time after imaging is within a predetermined time (for example, within 10 minutes), that is, a freshly captured image. At this time, the control unit 140 may control the display unit 110 to display the freshly captured image for a predetermined time (for example, 10 minutes), as described above.

In addition, in a case where the control unit 140 determines that the user remains near the same place after a predetermined interval time (for example, 20 minutes) has elapsed after the end of display of the freshly captured image as described above, the control unit 140 may subsequently perform display control based on the context related to the current position. That is, the control unit 140 controls the display unit 110 to display an image captured in the past in the vicinity of the current position.

Here, in a case where there is a plurality of corresponding images, the control unit 140 may control the display unit 110 to display an image randomly selected from the plurality of images. On the other hand, at this time, the control unit 140 may perform control such that the freshly-captured images that have been already displayed might not be continuously displayed based on the context related to the elapsed time after the imaging. That is, the control unit 140 may preliminarily exclude, from the selection candidates, the freshly captured image displayed immediately before so that the freshly captured image displayed based on the elapsed time after imaging is not displayed again, for example, after 20 minutes, and then may randomly select an image captured in the vicinity of the current position.

1.4. Demo Mode and User's Permission

Next, a demo mode and user's permission according to the present embodiment will be described in detail. The above has described effects of giving the user a surprise, nostalgia, and a sense of happiness achieved by performing ambient display of the images captured by the user in the past based on the context.

On the other hand, in the present embodiment, using the image captured by the user in the past for ambient display is premised on acquisition of user's permission before the start of supplying the function. However, since mobile devices of recent years are provided with various functions, it is likely that the user has not recognized the ambient display function according to the present embodiment.

To handle this, the control unit 140 according to the present embodiment may provide the user with information and promotion on the ambient display function according to the present embodiment by executing a demo mode using sample images during the time for acquisition of user's permission.

Figure 8:
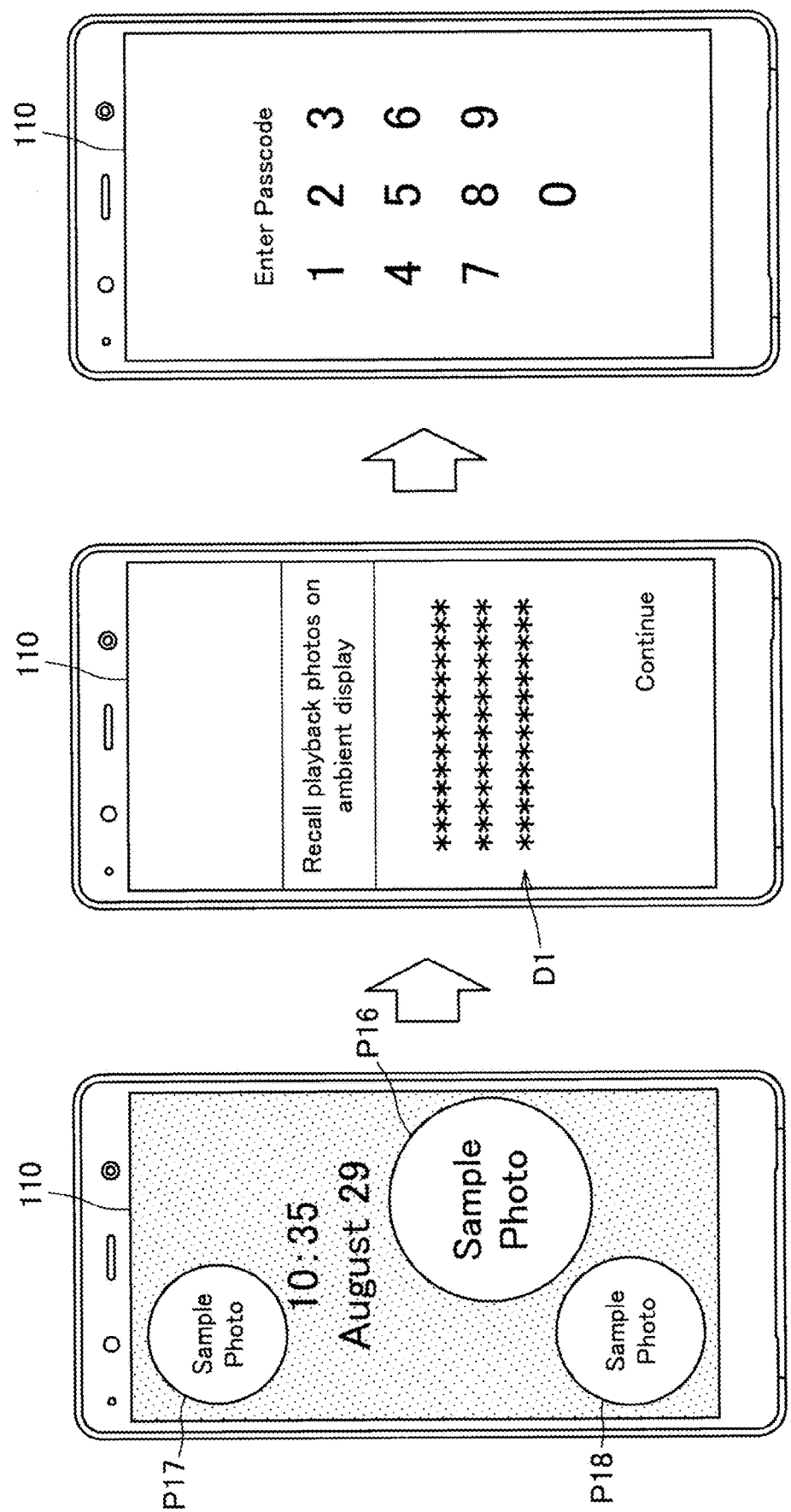
FIG. 8 is a view illustrating operation in a demo mode according to the embodiment.
Figure 9:
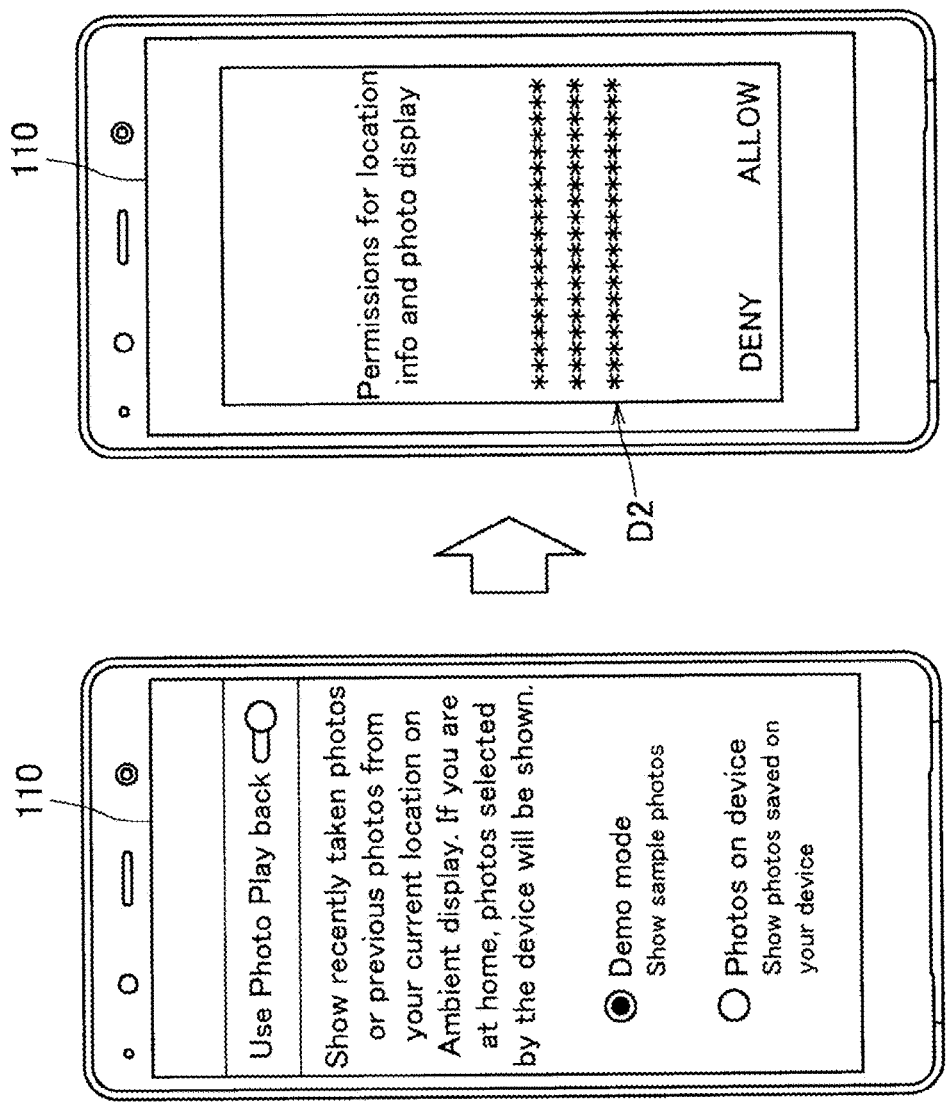
FIG. 9 is a view illustrating operation in the demo mode according to the embodiment.

FIGS. 8 and 9 are views illustrating operation in the demo mode according to the present embodiment. The left-side figure of FIG. 8 illustrates a state where the control unit 140 according to the present embodiment controls the display unit 110 to perform ambient display of pre-registered sample images P16 to P18.

The control unit 140 may execute the demo as described above, for example, when one or two weeks have passed since the user started using the information processing apparatus 10 and the user gets familiar with the operation of the information processing apparatus 10. In addition, the control unit 140 may execute the demo at a time zone in which many users are estimated to be at home with extra time, such as 19:00 to 21:00, compared to other time zones.

Here, when the user is interested in the ambient display sample images P16 to P18 and selects one of them by tapping or the like, the control unit 140 controls the display unit 110 to display information including an explanatory text D1 related to the ambient display function, as illustrated in the center of FIG. 8 so as to allow the user to grasp the outline of the function.

Furthermore, in a case where the user has performed a setting continuation operation, the control unit 140 controls the display unit 110 to display a screen-lock screen as illustrated on the right side of FIG. 8 so as to prompt the user to unlock the information processing apparatus 10.

Here, when the apparatus is unlocked, the control unit 140 controls the display unit 110 to display a setting screen for the ambient display according to the present embodiment as illustrated on the left side of FIG. 9 so as to prompt the user to activate the function.

Subsequently, in a case where the user has performed an operation of activating the ambient display function according to the present embodiment, the control unit 140 controls the display unit 110 to display an explanatory text D2 requesting for a permission for acquisition of position information and use of the captured image, as illustrated on the right side of FIG. 9.

Here, in a case where the user has selected permission, the control unit 140 activates the ambient display function according to the present embodiment, and thereafter controls the ambient display of the captured image based on the context.

The demo mode and the user's permission according to the present embodiment have been described as above. According to the above-described demo mode controlled by the control unit 140 according to the present embodiment, it is possible to effectively provide the user with information and promotion on the ambient display function according to the present embodiment.

Note that the setting screen related to the ambient display function illustrated on the left side of FIG. 9 is designed so as to be able to be transitioned from the setting menu of the information processing apparatus 10. Furthermore, in a case where the user selects the sample image displayed in the demo mode and grasps the outline of the ambient display function according to the present embodiment and then performs the setting continuation operation, the explanatory text D2 illustrated on the right side of FIG. 9 may be displayed without going through the setting screen described above.

1.5. Control Flow

Figure 10:
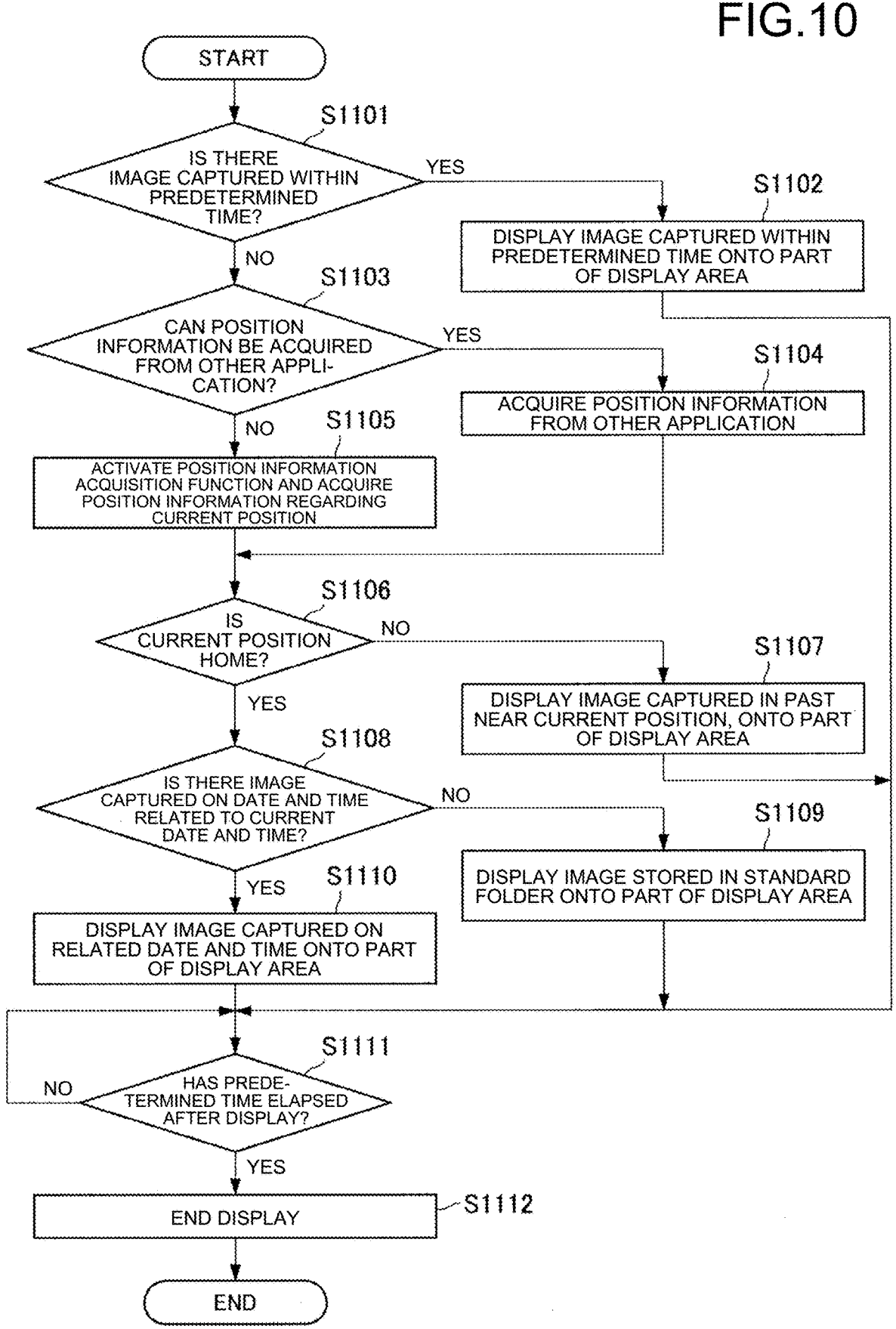
FIG. 10 is a flowchart illustrating a flow of display control by a control unit 140 according to the embodiment.

Next, a flow of display control according to the present embodiment will be described in detail. FIG. 10 is a flowchart illustrating a flow of display control by the control unit 140 according to the present embodiment.

Referring to FIG. 10, the control unit 140 first determines whether there is an image captured within a predetermined time (S1101). Here, in a case where there is an image for which elapsed time after imaging is within a predetermined time (S1101: Yes), the control unit 140 controls to display the image on a part of the display area of the display unit 110 (S1102).

In contrast, when there is no image for which elapsed time after imaging is within the predetermined time (S1101: No), the control unit 140 attempts to acquire position information.

At this time, the control unit 140 according to the present embodiment first determines whether position information can be acquired from other applications using a Geofence or the like (S1103).

Here, in a case where position information can be acquired from the other application (S1103: Yes), the control unit 140 acquires the position information from the other application (S1104). Here, in addition to the latitude and longitude information, the position information may include a determination result ("home" or "workplace", for example) related to the current position.

As described above, the control unit 140 according to the present embodiment may preferentially use the position information acquired from another application for display control. According to such control, power consumption can be effectively reduced without unnecessary activation of the position information acquisition function.

In contrast, in a case where there is a difficulty in acquiring position information from other applications (S1103: No), the control unit 140 controls the sensor unit 130 to activate the position information function and acquires the position information related to the current position (S1105).

Next, the control unit 140 determines (S1106) whether the information processing apparatus 10 is located at the user's home based on the position information acquired in either step S1104 or S1105.

Here, in a case where the user is estimated to be using the information processing apparatus 10 at a place other than the home, that is, outside the home (S1106: No), the control unit 140 controls to display an image captured in the past near the current position, onto a part of the display area of the display unit 110 (S1107).

In contrast, in a case where the user is estimated to be using the information processing apparatus 10 at home (S1106: Yes), the control unit 140 determines whether there is an image captured at a date and time related to the current date and time (S1108).

Here, in a case where there is an image captured at the date and time related to the current date and time (S1108: Yes), the control unit 140 controls to display the image captured at the related date and time, onto a part of the display area of the display unit 110 (S1110).

In contrast, in a case there is no image captured at the date and time related to the current date and time (S1108: No), the control unit 140 randomly selects an image stored in a standard folder and controls to display the selected image onto a part of the display area of the display unit 110 (S1109).

The control unit 140 determines whether a predetermined time set in advance has elapsed (S1111) after controlling the display unit 110 to start displaying an image in any of steps S1102, S1107, S1109, or S1110. The control unit 140 repeatedly executes the determination in step S1111 until the predetermined time has elapsed.

In contrast, when a predetermined time has elapsed from the start of display (S1111: Yes), the control unit 140 controls the display unit 110 to end the display of the image (S1112).

Hereinabove, a flow of the display control by the control unit 140 according to the present embodiment has been described. The flow described above with reference to FIG. 10 is merely an example, and the control flow by the control unit 140 according to the present embodiment can be flexibly modified. For example, the user may be allowed to freely set the type and priority of the context used for the ambient display control. Furthermore, the user may be allowed to set so that the determination regarding the home or the destination in step S1106 would not be performed.

2. HARDWARE CONFIGURATION EXAMPLE

Figure 11:
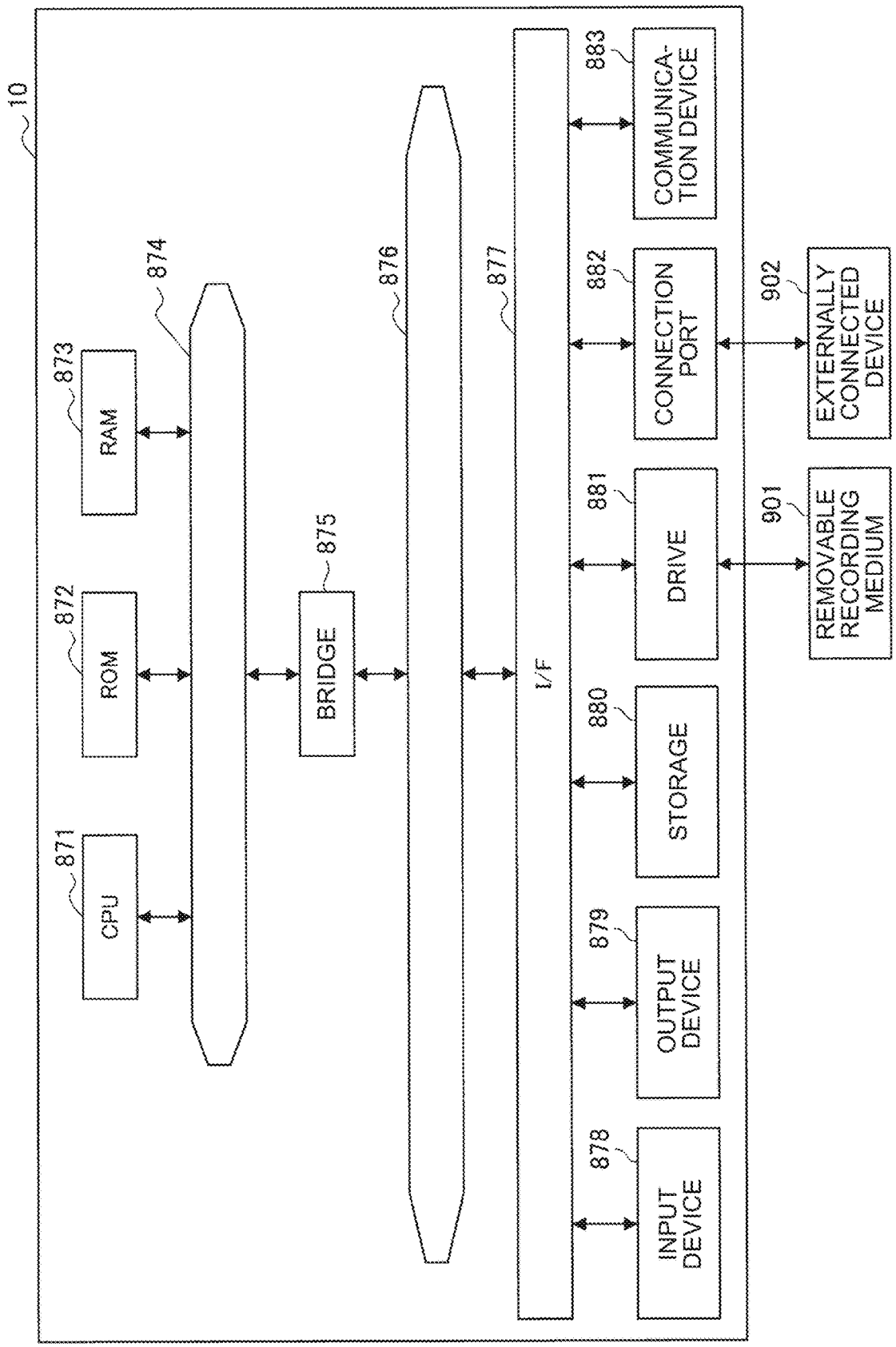
FIG. 11 is a diagram illustrating a hardware configuration example of an information processing apparatus according to an embodiment of the present disclosure.

Next, a hardware configuration example of the information processing apparatus 10 according to an embodiment of the present disclosure will be described. FIG. 11 is a block diagram illustrating a hardware configuration example of the information processing apparatus 10 according to an embodiment of the present disclosure. Referring to FIG. 11, the information processing apparatus 10 includes, for example, a processor 871, ROM 872, RAM 873, a host bus 874, a bridge 875, an external bus 876, an interface 877, an input device 878, an output device 879, storage 880, a drive 881, a connection port 882, and a communication device 883. The hardware configuration illustrated here is an example, and some of the components may be omitted. Moreover, the information processing apparatus 10 may further include components other than the components illustrated here.

(Processor 871)

The processor 871 functions as an arithmetic processing device or a control device, for example, and controls the entire or part of operation of individual components based on various programs recorded in the ROM 872, the RAM 873, the storage 880, or a removable recording medium 901.

(ROM 872, RAM 873)

The ROM 872 is a unit that stores a program read by the processor 871 and data used for calculation. The RAM 873 temporarily or permanently stores, for example, a program read by the processor 871 and various parameters that appropriately change at execution of the program.

(Host bus 874, bridge 875, external bus 876, interface 877)

The processor 871, the ROM 872, and the RAM 873 are connected to each other via a host bus 874 capable of high-speed data transmission, for example. On the other hand, the host bus 874 is connected to the external bus 876, which has a relatively low data transmission rate, via the bridge 875, for example. The external bus 876 is also connected to various components via the interface 877.

(Input Device 878)

Examples of the input device 878 include a mouse, a keyboard, a touch panel, a button, a switch, a lever, or the like. Furthermore, the input device 878 can include a remote controller (hereinafter, remote-controller) capable of transmitting a control signal using infrared rays or other radio waves. Furthermore, the input device 878 includes a voice input device such as a microphone.

(Output Device 879)

The output device 879 is a device capable of visually or audibly notifying the user with acquired information. Examples of this include a display device such as a Cathode Ray Tube (CRT), an LCD, or an organic EL, an audio output device such as a speaker or headphones, a printer, a mobile phone, a facsimile, or the like. Furthermore, the output device 879 according to the present disclosure includes various vibrating devices capable of outputting tactile stimuli.

(Storage 880)

The storage 880 is a device for storing various types of data. Examples of the storage 880 include a magnetic storage device such as a hard disk drive (HDD), a semiconductor storage device, an optical storage device, or a magneto-optical storage device.

(Drive 881)

The drive 881 is a device that reads information recorded in a removable recording medium 901 such as a magnetic disk, an optical disk, a magneto-optical disk, or the semiconductor memory, or writes information onto the removable recording medium 901.

(Removable Recording Medium 901)

Examples of the removable recording medium 901 include a DVD medium, a Blu-ray (registered trademark) medium, an HD DVD medium, or various types of semiconductor storage media. The removable recording medium 901 may of course, be implemented as an IC card equipped with a non-contact type IC chip, an electronic device, or the like.

(Connection Port 882)

The connection port 882 is a port for connecting an externally connected device 902, and example of this include a Universal Serial Bus (USB) port, an IEEE1394 port, a Small Computer System Interface (SCSI), an RS-232C port, or an optical audio terminal.

(Externally Connected Device 902)

Examples of the externally connected device 902 include a printer, a portable music player, a digital camera, a digital video camera, an IC recorder, or the like.

(Communication Device 883)

The communication device 883 is a device provided for connecting to a network, and examples of this include a wired or wireless LAN, Bluetooth (registered trademark), a communication card for Wireless USB (WUSB), a router for optical communication, a router for Asymmetric Digital Subscriber Line (ADSL) or a modem for various types of communications.

3. SUMMARY

As described above, the information processing apparatus 10 according to an embodiment of the present disclosure includes the control unit 140 that controls the display of the visual information performed by the display unit 110. In addition, the control unit 140 according to an embodiment of the present disclosure is characterized by controlling to display, on the basis of a recognized context, one or more images highly related to the context among the images captured by the user in the past, onto a part of a display area of the display unit 110. With such a configuration, it is possible to present information that is surprising to the user.

Preferred embodiments of the present disclosure have been described as above in detail with reference to the accompanying drawings, in which the technical scope of the present disclosure is not limited to such examples. A person skilled in the art in the technical field of the present disclosure may find it understandable to reach various alterations and modifications within the technical scope of the appended claims, and it should be understood that they be naturally included within the technical scope of the present disclosure.

Furthermore, the effects described in the present specification are merely illustrative or exemplifying, and are not limiting. That is, the technology according to the present disclosure can exhibit other effects obvious to those skilled in the art from the description of the present specification together with the above effects or instead of the above effects.

It is also possible to create a program for providing hardware such as the CPU, ROM, and RAM built in the computer with the functions equivalent to the configuration of the information processing apparatus 10 and possible to provide a computer-readable recording medium that records the program.

Furthermore, individual steps related to the process of the information processing apparatus 10 in the present specification does not necessarily need to be processed in time series in the order described in the flowchart. For example, the steps related to the processing of the information processing apparatus 10 may be processed in an order different from the order described in the flowchart or may be processed in parallel.

The following configurations also belong to the technical scope of the present disclosure.

(1) An information processing apparatus comprising
a control unit that controls display of visual information performed by a display unit included in a mobile terminal,
wherein the control unit controls to display, based on a recognized context, one or more images highly related to the context among images captured by a user in past, onto a part of a display area of the display unit.

(2) The information processing apparatus according to (1),
wherein the control unit controls the display unit to perform ambient display of one or more images highly related to the context.

(3) The information processing apparatus according to (1) or (2),
wherein the control unit controls the display unit to display one or more images highly related to the context, as a part of a background.

(4) The information processing apparatus according to any one of (1) to (3),
wherein the context includes position information, and
the control unit controls the display unit to display an image captured in the past by the user in vicinity of a current position, based on the acquired current position.

(5) The information processing apparatus according to (4),
wherein, in a case where the mobile terminal is estimated to be located outside a home based on the acquired current position, the control unit restricts an image to be displayed by the display unit to the image captured in vicinity of the current position.

(6) The information processing apparatus according to (4) or (5),
wherein, in a case where the mobile terminal is estimated to be located at a place of residence of the user based on the acquired current position, the control unit controls the display unit to display one or more images selected from a plurality of images captured by the user in the past.

(7) The information processing apparatus according to any one of (1) to (6),
wherein the context includes date and time information, and the control unit controls the display unit to display an image captured by the user at a date and time related to the current date and time, based on the acquired current date and time.

(8) The information processing apparatus according to (7), wherein, in a case where the mobile terminal is estimated to be located at a place of residence of the user based on the acquired current position, the control unit controls the display unit to display an image captured by the user at a date and time related to the current date and time.

(9) The information processing apparatus according to any one of (1) to (8), wherein the context includes a fellow person of a user who uses the mobile terminal, and the control unit controls the display unit to display an image that contains the fellow person as a subject.

(10) The information processing apparatus according to any one of (1) to (9), wherein the context includes an elapsed time after imaging, and the control unit controls the display unit to display an image for which the elapsed time after imaging is within a predetermined time.

(11) The information processing apparatus according to (10), wherein, in a case where there is a plurality of images for which an elapsed time after imaging is within a predetermined time, the control unit controls so as to suppress simultaneous display of a plurality of images having imaging date and time shorter than a predetermined interval.

(12) The information processing apparatus according to any one of (1) to (11), wherein the control unit ends displaying an image after a lapse of a predetermined time from controlling the display unit to start the display of the image.

(13) The information processing apparatus according to (12), wherein the control unit controls the display unit to display an image and further controls the display unit to suppress display of an image until a predetermined time has elapsed after the end of the display.

(14) The information processing apparatus according to any one of (1) to (13), wherein the control unit preferentially uses position information acquired from another application, for display control.

(15) The information processing apparatus according to (14), in a case where the control unit has difficulty in acquiring the position information from another application, the control unit activates a position information acquisition function of the mobile terminal to acquire the position information.

(16) The information processing apparatus according to (2), wherein, in a case where the user selects an image that is presented in ambient display by the display unit, the control unit enlarges and displays the image as a whole.

(17) The information processing apparatus according to any one of (1) to (16), wherein the control unit controls display unit to display one or more registered sample images before confirmation of user's permission regarding image display based on the context.

(18) The information processing apparatus according to any one of (1) to (17), wherein the apparatus is the mobile terminal including the display unit.

(19) An information processing method comprising controlling, by a processor, display of visual information performed by a display unit included in a mobile terminal, wherein the controlling further includes controlling to display, based on a recognized context, one or more images highly related to the context among images captured by a user in past, onto a part of a display area of the display unit.

REFERENCE SIGNS LIST

10 INFORMATION PROCESSING APPARATUS
110 DISPLAY UNIT
120 IMAGING UNIT
130 SENSOR UNIT
140 CONTROL UNIT
150 COMMUNICATION UNIT
20 NETWORK

The invention claimed is:

1. An information processing apparatus, comprising:
processing circuitry configured to
control display of visual information performed by a display included in a mobile terminal,
display, based on a recognized context, one or more images highly related to the context among images captured by a user in past, onto a part of a display area of the display, wherein the context includes position information,
display an image captured in the past by the user in vicinity of a current position, based on the acquired current position,
in a case where the mobile terminal is estimated to be located outside a home based on the acquired current position, restrict an image to be displayed by the display to the image captured in vicinity of the current position, and
control the display to perform ambient display of the one or more images highly related to the context.

2. The information processing apparatus according to claim 1,
wherein the processing circuitry is further configured to control the display to display one or more images highly related to the context, as a part of a background.

3. The information processing apparatus according to claim 1,
wherein, in a case where the mobile terminal is estimated to be located at a place of residence of the user based on the acquired current position, the processing circuitry is further configured to control the display to display one or more images selected from a plurality of images captured by the user in the past.

4. The information processing apparatus according to claim 1,
wherein the context includes date and time information, and
the processing circuitry is further configured to control the display to display an image captured by the user at a date and time related to the current date and time, based on the acquired current date and time.

5. The information processing apparatus according to claim 4,
wherein, in a case where the mobile terminal is estimated to be located at a place of residence of the user based on the acquired current position, the processing circuitry is further configured to control the display to display an image captured by the user at a date and time related to the current date and time.

6. The information processing apparatus according to claim 1,
wherein the context includes a fellow person of a user who uses the mobile terminal, and
the processing circuitry is further configured to control the display to display an image that contains the fellow person as a subject.

7. The information processing apparatus according to claim 1,
wherein the context includes an elapsed time after imaging, and
the processing circuitry is further configured to control the display to display an image for which the elapsed time after imaging is within a predetermined time.

8. The information processing apparatus according to claim 7,
wherein, in a case where there is a plurality of images for which an elapsed time after imaging is within a predetermined time, the processing circuitry is further configured to suppress simultaneous display of a plurality of images having imaging date and time shorter than a predetermined interval.

9. The information processing apparatus according to claim 1,
wherein the processing circuitry is further configured to end displaying an image after a lapse of a predetermined time from controlling the display to start the display of the image.

10. The information processing apparatus according to claim 9,
wherein the processing circuitry is further configured to control the display to display an image and further control the display to suppress display of an image until a predetermined time has elapsed after the end of the display.

11. The information processing apparatus according to claim 1,
wherein the processing circuitry is further configured to preferentially use position information acquired from another application, for display control.

12. The information processing apparatus according to claim 11,
in a case where the processing circuitry has difficulty in acquiring the position information from another application, the processing circuitry is further configured to activate a position information acquisition function of the mobile terminal to acquire the position information.

13. The information processing apparatus according to claim 1,
wherein, in a case where the user selects an image that is presented in the ambient display, the processing circuitry is configured to enlarge and display the image as a whole.

14. The information processing apparatus according to claim 1,
wherein the processing circuitry is further configured to display one or more registered sample images before confirmation of user's permission regarding image display based on the context.

15. The information processing apparatus according to claim 1,
wherein the apparatus is the mobile terminal including the display.

16. An information processing method, comprising:
controlling, by a processor, display of visual information performed by a display included in a mobile terminal,
displaying, based on a recognized context, one or more images highly related to the context among images captured by a user in past, onto a part of a display area of the display,
displaying an image captured in the past by the user in vicinity of a current position, based on the acquired current position, and
in a case where the mobile terminal is estimated to be located outside a home based on the acquired current position, restricting an image to be displayed by the display to the image captured in vicinity of the current position, and
controlling the display to perform ambient display of the one or more images highly related to the context.

* * * * *